(12) United States Patent  
Kominami et al.

(10) Patent No.: US 8,948,582 B2  
(45) Date of Patent: Feb. 3, 2015

(54) HEAT MEDIUM HEATING DEVICE AND VEHICLE AIR CONDITIONER INCLUDING THE SAME

(71) Applicant: Mitsubishi Heavy Industries Automotive Thermal Systems Co., Ltd., Kiyosu-shi, Aichi (JP)

(72) Inventors: Satoshi Kominami, Tokyo (JP); Naoto Kunieda, Aichi (JP)

(73) Assignee: Mitsubishi Heavy Industries Automotive Thermal Systems Co., Ltd., Kiyosu-shi (JP)

(*) Notice: Subject to any disclaimer, the term of this patent is extended or adjusted under 35 U.S.C. 154(b) by 174 days.

(21) Appl. No.: 13/765,081

(22) Filed: Feb. 12, 2013

(65) Prior Publication Data  
US 2013/0230302 A1 Sep. 5, 2013

(30) Foreign Application Priority Data  
Mar. 2, 2012 (JP) ................................. 2012-046802

(51) Int. Cl.  
*F24H 1/10* (2006.01)  
*F24H 9/20* (2006.01)

(52) U.S. Cl.  
CPC ......................................... *F24H 9/20* (2013.01)  
USPC ............................ 392/480; 392/377; 165/175

(58) Field of Classification Search  
None  
See application file for complete search history.

(56) References Cited

U.S. PATENT DOCUMENTS

| 4,459,466 | A | * | 7/1984 | Nakagawa et al. | 392/307 |
| 5,057,672 | A | * | 10/1991 | Bohlender et al. | 219/540 |
| 5,256,857 | A | * | 10/1993 | Curhan et al. | 219/202 |
| 5,377,298 | A | * | 12/1994 | Yang | 392/360 |
| 5,471,034 | A | * | 11/1995 | Kawate et al. | 219/485 |
| 5,562,844 | A | * | 10/1996 | Bohlender et al. | 219/540 |
| 5,995,711 | A | * | 11/1999 | Fukuoka et al. | 392/347 |
| 6,055,360 | A | * | 4/2000 | Inoue et al. | 392/485 |
| 6,093,909 | A | * | 7/2000 | Beetz et al. | 219/208 |
| 6,124,570 | A | * | 9/2000 | Ebner et al. | 219/202 |
| 6,178,292 | B1 | * | 1/2001 | Fukuoka et al. | 392/485 |
| 6,265,692 | B1 | * | 7/2001 | Umebayahi et al. | 219/202 |
| 6,392,207 | B2 | * | 5/2002 | Beetz et al. | 219/530 |
| 6,919,535 | B2 | * | 7/2005 | Uhl et al. | 219/202 |
| 6,940,050 | B2 | * | 9/2005 | Probst | 219/486 |
| 6,957,013 | B2 | * | 10/2005 | Zimmer | 392/397 |

(Continued)

FOREIGN PATENT DOCUMENTS

| JP | 2008-7106 A | 1/2008 |
| JP | 2010-252460 A | 11/2010 |

(Continued)

*Primary Examiner* — Thor Campbell  
(74) *Attorney, Agent, or Firm* — Westerman, Hattori, Daniels & Adrian, LLP

(57) ABSTRACT

In a heat medium heating device 10 in which a heat exchange element 20 formed by stacking multiple flat heat exchange tubes 21 and multiple pairs of PTC heaters 26 in multiple layers is fastened and fixed into a casing 11 including heat medium outlet and inlet paths 15 and 16, connection portions 48 and 49 between a power supply HV harness and a control LV harness 44 are provided on an outer surface on one surface side where the heat medium outlet and inlet paths 15 and 16 of the casing 11 are provided, and a control substrate 33 that controls energization to the PTC heaters 26 is disposed on an inside on the same side as a surface on which the connection portions 48 and 49 of the casing 11 is provided.

18 Claims, 7 Drawing Sheets

(56) References Cited

U.S. PATENT DOCUMENTS

| | | | |
|---|---|---|---|
| 7,026,584 B2* | 4/2006 | Bohlender | 219/548 |
| 7,971,799 B2* | 7/2011 | Colette et al. | 237/12.3 B |
| 7,977,606 B2* | 7/2011 | Adachi et al. | 219/202 |
| 8,249,986 B2* | 8/2012 | Scipioni et al. | 705/39 |
| 2008/0000889 A1* | 1/2008 | Niederer et al. | 219/205 |
| 2008/0053981 A1* | 3/2008 | Adachi et al. | 219/202 |
| 2011/0180617 A1* | 7/2011 | Saito et al. | 236/49.3 |
| 2012/0237192 A1* | 9/2012 | Kominami et al. | 392/480 |

FOREIGN PATENT DOCUMENTS

| | | |
|---|---|---|
| JP | 2011-16489 A | 1/2011 |
| JP | 2011-79344 A | 4/2011 |

* cited by examiner

HEAT MEDIUM HEATING DEVICE AND VEHICLE AIR CONDITIONER INCLUDING THE SAME

CROSS-REFERENCE TO RELATED APPLICATIONS

This application is based on Japanese Patent Application No. 2012-046802, the contents of which are incorporated herein by reference.

BACKGROUND OF THE INVENTION

1. Field of the Invention

The present invention relates to a heat medium heating device that heats a heat medium using a PTC heater, and a vehicle air conditioner including the heat medium heating device.

2. Description of Related Art

There is known a heat medium heating device which is provided in a vehicle air conditioner applied to an electric vehicle, a hybrid vehicle, or the like to heat a heated medium serving as a heat source for heating. The heat medium heating device incorporates a PTC heater using a positive characteristic thermistor element (Positive Temperature Coefficient; hereinafter referred to as "PTC element") as a heat generation element. Japanese Unexamined Patent Application, Publication No. 2008-7106 discloses an example of such a heat medium heating device. The heat medium heating device has a structure in which a number of partitions are provided to partition the inside of a housing including an outlet and inlet paths for heat medium into a heating chamber and a heat medium circulation chamber, and PTC heaters are inserted and installed so as to contact the partitions on the heating chamber side to heat the heat medium circulating on the circulation chamber side. Further, a control substrate of each PTC heater is disposed at an upper position thereof.

In addition, Japanese Unexamined Patent Application, Publication No. 2011-16489 discloses a heat medium heating device having a stacked structure in which a pair of heat medium circulating portions are stacked and disposed on both surfaces of each PTC heater so as to sandwich each PTC heater, and a substrate accommodating portion that accommodates a control substrate is provided on one side. Furthermore, Japanese Unexamined Patent Application, Publication No. 2011-79344 discloses a heat medium heating device in which a heat exchange portion provided with a number of flat heat exchange tubes between a pair of headers in a casing including an outlet and inlet paths for heat medium; PTC heaters are installed between the flat heat exchange tubes; and a control substrate of each PTC heater is disposed at an upper position thereof.

Thus, the techniques disclosed in Japanese Unexamined Patent Application, Publication Nos. 2008-7106 and 2011-79344 have problems in that it is difficult to bring each partition serving as a heat transfer surface or the flat heat exchange tube into close contact with each PTC heater; and the heat transfer efficiency is reduced, for example. On the other hand, according to the technique disclosed in Japanese Unexamined Patent Application, Publication No. 2011-16489, each PTC heater and each heat medium circulating portion can be stacked to fastened and fixed, thereby increasing the adhesion and reducing the contact thermal resistance. However, it is difficult to dispose a number of PTC heaters in multiple layers, and there are limitations on reduction in size and weight and reduction in costs.

Under such circumstances, the heat medium heating device has been developed in which heat exchange tubes each having a flat structure are used; the flat heat exchange tubes and PTC heaters are stacked in multiple layers to constitute a heat exchange element; the heat exchange element is fastened and fixed to be incorporated into a casing, thereby making it possible to improve the heat transfer efficiency and reduce the size, weight, and costs.

As described above, in the heat medium heating device in which the heat exchange element having a structure in which flat heat exchange tubes and PTC heaters are stacked is pressed to be fastened and fixed into the casing, the contact thermal resistance between the flat heat exchange tubes and the PTC heaters can be reduced and the heat transfer efficiency can be improved, thereby achieving a downsized, high-performance heat medium heating device. Accordingly, in the heat medium heating device, the dimension in the height direction of the heat medium heating device and the workability upon connection of heat medium pipes and harnesses are varied depending on the structure of the heat exchange element, as well as the structure of the casing, how to provide the heat medium outlet and inlet paths and the harness connection portion in the casing, which surface of the casing the heat exchange element is fastened and fixed, and which position the control substrate is disposed, for example.

From the vehicle side mounting the air conditioner, in the mounting state from the viewpoint of workability, a piping connection work for the heat medium outlet and inlet paths and a connection work for a power supply HV harness, a control LV harness, and the like are required on the surface opposite to the mounting surface. On the premise of this fact, there are some problems to be improved, that is, how to reduce the dimension in the height direction of the heat medium heating device, and how to improve the workability upon connection of harnesses to the control substrate, for example.

BRIEF SUMMARY OF THE INVENTION

The present invention has been made in view of such circumstances, and it is an object of the present invention to provide a heat medium heating device downsized by reducing the dimension in the height direction of the heat medium heating device as much as possible and of improving the workability upon connection of harnesses to the control substrate, and a vehicle air conditioner including the heat medium heating device.

To solve the above-mentioned problems, the heat medium heating device of the present invention and the vehicle air conditioner including the heat medium heating device employ the following solutions.

That is, a heat medium heating device according to the present invention includes: a plurality of flat heat exchange tubes through which a heat medium flowing from an inlet header portion flows through a flat tube portion and flows out from an outlet header portion; and a plurality of pairs of PTC heaters incorporated between the flat tube portions of the plurality of flat heat exchange tubes. A heat exchange element formed by alternately stacking the flat heat exchange tubes and the PTC heaters in multiple layers is fastened and fixed into a casing including heat medium outlet and inlet paths communicating with the outlet header portion and the inlet header portion. A connection portion between a power supply HV harness and a control LV harness is formed on an outer surface on the same side as a surface on which the heat medium outlet and inlet paths of the casing are formed, and a control substrate that controls energization to the PTC heaters is disposed on an inside on the same side as the surface on which the connection portion of the casing is formed.

According to the present invention, the heat exchange element formed by alternately stacking the plurality of flat heat exchange tubes and the plurality of pairs of PTC heaters in multiple layers is provided in the heat medium heating device fasted and fixed into the casing including the heat medium outlet and inlet paths communicating with the outlet/inlet header portion of the flat heat exchange tubes. The connection portion between the power supply HV harness and the control LV harness is provided on the outer surface on the same side as the surface on which the heat medium outlet and inlet paths of the casing are formed, and the control substrate that controls energization to the PTC heaters is disposed on the inside on the same side as the surface on which the connection portion of the casing is formed. Accordingly, the connection portion between the power supply HV harness and the control LV harness is disposed using a side space of the outer surface on which the heat medium outlet and inlet paths of the casing are provided, and the control substrate is disposed using a side space of the inner surface of the casing. This makes it possible to reduce the dimension in the height direction of the apparatus including the heat medium outlet and inlet paths and the connection portion between the harnesses, and also makes it possible to dispose the connection portion of the harnesses and the control substrate to be adjacent to each other on the inside and outside of the same surface of the casing. Accordingly, the heat medium heating device can be downsized and the on-board capability with respect to a vehicle can be improved. Moreover, the workability upon connection of the harnesses and the control substrate can be improved.

Furthermore, according to the heat medium heating device of the present invention, in the heat medium heating device of the present invention described above, the casing is provided with a partition wall formed therein; the heat exchange element is pressed by a heat exchange pressing member and fastened and fixed to one surface of the partition wall, and an outside thereof is sealed with a bottom plate; and the control substrate is installed on the other side of the partition wall, and an outside thereof is sealed with an upper plate including the connection portion.

According to the present invention, the casing is provided with a partition wall formed therein; the heat exchange element is pressed by the heat exchange pressing member and fastened and fixed to one surface of the partition wall, and an outside thereof is sealed with a bottom plate; and the control substrate is installed on the other side of the partition wall, and an outside thereof is sealed with an upper plate including the connection portion. Accordingly, the heat exchange element is fastened and fixed to the casing, in which the partition wall is provided, with the partition wall interposed therebetween; the control substrate is installed on the other surface side, and the bottom plate and the upper plate on both sides of the control substrate are sealed, thereby enabling the heat exchange element and the control substrate to be accommodated and installed in the casing. This enables the PTC heaters, the control substrate, and the harness connection portion of the heat exchange element requiring electrical connection to be disposed adjacent to each other, and improves the workability upon electrical connection therebetween.

Furthermore, in the heat medium heating device of the present invention, a control circuit including an exothermic electrical component that controls the PTC heaters is mounted on the control substrate, the exothermic electrical component being capable of cooling with the partition wall as a heat sink.

According to the present invention, a control circuit including an exothermic electrical component that controls the PTC heaters is mounted on the control substrate, the exothermic electrical component being capable of cooling with the partition wall as a heat sink. Accordingly, the exothermic electrical component, such as a power transistor, is mounted on the control substrate installed on the other surface side of the partition wall, and the heat exchange element fastened and fixed to one surface side of the partition wall can be efficiently cooled with the partition wall serving as a cooling source as a heat sink. Therefore, the reliability of the cooling performance with respect to heat of the control substance including the exothermic electrical component can be secured, and the operation can be stabilized.

Furthermore, according to the heat medium heating device of the present invention, in any of the heat medium heating devices described above, a control circuit including an exothermic electrical component that controls the PTC heaters is mounted on the surface of the control substrate, and a heat penetration portion made of a high heat-conductive material and penetrating through both surfaces corresponding to a mounting position of the exothermic electrical component is provided, the exothermic electrical component being capable of cooling with the partition wall as a heat sink through the heat penetration portion.

According to the present invention, the control circuit including the exothermic electrical component that controls the PTC heaters is mounted on the surface of the control substrate, and the heat penetration portion made of a high heat-conductive material and penetrating through both surfaces corresponding to the mounting position of the exothermic electrical component is provided, the exothermic electrical component being capable of cooling with the partition wall as a heat sink through the heat penetration portion. Accordingly, heat generated from the exothermic electrical component formed of a power transistor, such as an IGBT, which is mounted on the control substrate, is transferred to the back surface side through the heat penetration portion made of a high heat-conductive material such as copper, and is further transferred to the partition wall serving as a heat sink from the heat penetration portion, thereby enabling the heat exchange element to be effectively cooled through the partition wall serving as a cooling source. Accordingly, heat-resistant properties of the control substrate including the exothermic electrical component can be improved and the operation can be stabilized.

Furthermore, according to the heat medium heating device of the present invention, in the heat medium heating device described above, a heat conductive insulator, such as a heat conductive liquid gap material or a low-hardness insulating heat conductive sheet, is interposed between the heat penetration portion of the control substrate and the partition wall.

According to the present invention, the heat conductive insulator, such as a heat conductive liquid gap material or a low-hardness insulating heat conductive sheet, is interposed between the heat penetration portion of the control substrate and the partition wall. Accordingly, even when there are manufacturing variations in a retracting amount or a projecting amount from the back surface of the control substrate of the heat penetration portion, the heat generated from the exothermic electrical component can be reliably transferred to the partition wall through the heat penetration portion and the heat conductive insulator such as a heat conductive liquid gap material or a low-hardness insulating heat conductive sheet, regardless of the variation. Furthermore, the exothermic electrical component can be cooled with the partition wall as a heat sink. Accordingly, the heat radiation properties and electrical insulating properties of the control substrate on which the exothermic electrical component is mounted can be secured and the quality of the heat medium heating device can be improved.

Further, according to the heat medium heating device of the present invention, in the heat medium heating device described above, the control substrate is disposed on an upper surface of the partition wall through an insulating sheet, and the insulating sheet is provided with an opening corresponding to a portion in which the heat conductive liquid gap material is interposed.

According to the present invention, the control substrate is disposed on the upper surface of the partition wall through the insulating sheet, and the insulating sheet is provided with the opening corresponding to the portion in which the heat conductive liquid gap material is interposed. Accordingly, the heat conductive liquid gap material is filled or disposed in the opening of the insulating sheet to assemble the control substrate, and the heat penetration portion on the side of the control substrate can be aligned with the heat conductive liquid gap material. Therefore, regardless of the retracting amount or the projecting amount of the heat penetration portion, the heat generated from the exothermic electrical component can be directly radiated to the partition wall through the heat penetration portion and the heat conductive liquid gap material. Even when a material cured from a liquid form may be used instead of a solid form as the heat conductive liquid gap material, the material can be filled and held in the opening. Accordingly, the heat radiation path from the exothermic electrical component can be reliably secured and the cooling performance can be improved. In this case, a hard sheet exclusively used for insulation, for example, a sheet such as a polyimide film, may be used as the insulating sheet, which enables reduction in cost.

Furthermore, according to the heat medium heating device of the present invention, in the heat medium heating device described above, the opening has an area larger than the area of the heat penetration portion.

According to the present invention, the opening has an area larger than the area of the heat penetration portion. Accordingly, even when the partition wall, the control substrate, the insulating sheet, and the like are shifted from each other due to integration of dimensional tolerance, the heat penetration portion can reliably be aligned with the heat conductive liquid gap material. Accordingly, the heat radiation path from the exothermic electrical component can be reliably formed and the cooling performance thereof can be improved.

Furthermore, according to heat medium heating device of the present invention, in any of the heat medium heating devices described above, an upper surface of the partition wall is provided with a plurality of protrusions, and holes formed in the insulating sheet and/or the control substrate are fit into the protrusions to enable positioning of the insulating sheet and/or the control substrate.

According to the present invention, the upper surface of the partition wall is provided with a plurality of protrusions, and holes formed in the insulating sheet and/or the control substrate are fit into the protrusions to enable positioning of the insulating sheet and/or the control substrate. Accordingly, in the case of disposing the insulating sheet and/or control substrate on the supper surface of the partition wall, the hole formed on the side of the insulating sheet and/or control substrate is fit to the protrusion formed on the side of the partition wall, thereby making it possible to reliably position and assembly each component. Accordingly, the position of the heat penetration portion on the side of the control substrate can be reliably aligned with the heat conductive liquid gap material for heat radiation, thereby improving the assembling accuracy and assembling workability.

Furthermore, according to the heat medium heating device of the present invention, in any of the heat medium heating devices described above, at least a portion serving as a heat sink of the partition wall is made of an aluminum alloy.

According to the present invention, at least the portion serving as a heat sink of the partition wall is made of an aluminum alloy. Accordingly, the heat generated from the exothermic electrical component mounted on the control substrate is transferred to the partition wall made of an aluminum alloy, which has a heat conductivity and light weight, through a heat conductive insulator such as a heat penetration portion, an insulating sheet and/or a heat conductive liquid gap filler, or a low-hardness insulating heat conductive sheet, and the heat is radiated to the partition wall with the heat exchange element as a cooling source, thereby making it possible to cool the exothermic electrical component. Accordingly, the cooling performance of the exothermic electrical component, which is mounted on the surface of the control surface, can be improved with the partition wall as a heat sink. Furthermore, the reliability with respect to the heat resistance can be improved and light weight can be maintained.

Furthermore, according to the heat medium heating device of the present invention, in any one of the heat medium heating devices described above, boss portions each having a predetermined height for fastening and fixing the heat exchange pressing member are integrally formed at four corners on the one side of the partition wall.

According to the present invention, the boss portions each having the predetermined height for fastening and fixing the heat exchange pressing member are integrally formed at four corners on the one side of the partition wall. Accordingly, the heat exchange pressing member is fastened and fixed to the boss portions at four corners, thereby making it possible to press the heat exchange element against the partition wall of the casing to thereby fasten and fix the heat exchange element. Thus, the flat heat exchange tubes and the PTC heaters, which constitute the heat exchange element, are brought into close contact with each other, and the outlet/inlet header portions of the plurality of flat heat exchange tubes are also brought into close contact with each other. This makes it possible to reduce the contact thermal resistance to thereby improve the heat transfer efficiency, and to prevent leakage of the medium to thereby improve the reliability.

Furthermore, according to the heat medium heating device of the present invention, in any of the heat medium heating devices described above, the heat medium outlet and inlet paths extend from the other surface of the partition wall, are opened to the one side on which the heat exchange element is fixed and installed through the partition wall, and re communicable with the outlet/inlet header portion of each of the flat heat exchange tubes.

According to the present invention, the heat medium outlet and inlet paths extend from the other surface of the partition wall, are opened to the one side on which the heat exchange element is fixed and installed through the partition wall, and are communicable with the outlet/inlet header portion of each of the flat heat exchange tubes. Accordingly, the outlet/inlet header portions of the flat heat exchange tubes of the heat exchange element incorporated into one surface side of the partition wall is allowed to communicate with the opening of the partition wall through a seal material around the communication hole, thereby enabling communication and connection with the heat medium outlet and inlet paths provided on the side of the casing. Thus, even when the heat medium outlet and inlet paths are structured to extend from the partition wall, the heat medium outlet and inlet paths are allowed to communicate with the outlet/inlet header portions of the flat heat exchange tubes through one seal material. Therefore, the flow passage for circulating the heat medium can be easily formed without complication.

Furthermore, according to the heat medium heating device of the present invention, in any of the heat medium heating devices described above, the partition wall is provided with a through-hole penetrating through a terminal extending from an electrode plate constituting each of the PTC heaters, and the terminal is connectable to a terminal board of the control substrate disposed on the other side with the partition wall interposed therebetween.

According to the present invention, the partition wall is provided with the through-hole penetrating through the terminal extending from an electrode plate constituting each of the PTC heaters, and the terminal is connectable to a terminal board of the control substrate disposed on the other side with the partition wall interposed therebetween. Accordingly, even when the control substrate and the heat exchange element are disposed on opposite sides with the partition wall interposed therebetween, the terminal extending from the electrode plate constituting each of the PTC heaters of the heat exchange element is allowed to project to the opposite side through the through-hole formed in the partition wall, and thus can be directly connected to the terminal board of the control substrate. Therefore, regardless of the presence or absence of the partition wall, each of the PTC heaters and the control substrate can be electrically connected easily.

Furthermore, according to the heat medium heating device of the present invention, in the heat medium heating device described above, the terminal is allowed to be positioned through a grommet installed in the through-hole.

According to the present invention, the terminal is allowed to be positioned through a grommet installed in the through-hole. Accordingly, when the terminal extending from the electrode plate of each of the PTC heaters is allowed to project to the opposite side through the through-hole provided in the partition wall, the terminal can be positioned through the grommet installed in the through-hole. Therefore, the terminal can be aligned with the terminal board of the control substrate without misalignment, and the connection work can be facilitated.

Furthermore, according to the heat medium heating device of the present invention, in the heat medium heating device described above, the casing includes a lower casing to which the heat exchange element is pressed to be fastened and fixed to an inner bottom surface through a heat exchange pressing member, and an upper casing provided with the heat medium outlet and inlet paths and the connection portion; the control substrate is disposed between an inner surface of the upper casing and an upper surface of the heat exchange pressing member; and the heat exchange pressing member is provided with a through-hole communicating with the outlet/inlet header portion of each of the flat heat exchange tubes, and a joint portion is integrally provided with the through-hole, the joint portion connecting the heat medium outlet and inlet paths provided on the upper casing with the through-hole so as to communicate with each other.

According to the present invention, the casing includes the lower casing to which the heat exchange element is pressed to be fastened and fixed to the inner bottom surface through the heat exchange pressing member, and the upper casing provided with the heat medium outlet and inlet paths and the connection portion; the control substrate is disposed between the inner surface of the upper casing and the upper surface of the heat exchange pressing member; and the heat exchange pressing member is provided with the through-hole communicating with the outlet/inlet header portion of each of the flat heat exchange tubes, and a joint portion is integrally provided with the through-hole, the joint portion connecting the heat medium outlet and inlet paths provided on the upper casing with the through-hole so as to communicate with each other. Accordingly, the heat exchange element is pressed to be fastened and fixed against the inner bottom surface of the lower casing by the heat exchange element; the control substrate is disposed between the heat exchange pressing member and the inner surface of the upper casing in which the heat medium outlet and inlet paths and the connection portion are provided; and the heat medium outlet and inlet paths on the side of the upper casing are allowed to communicate and connect with the joint portion provided on the heat exchange pressing member. This enables the heat exchange element and the control substrate to be accommodated and installed in the casing. Therefore, the PTC heaters of the heat exchange element, the control substrate, and the harness connection portion, which require electrical connection, can be disposed to be adjacent to each other, thereby improving the workability upon electrical connection therebetween. In this structure, there is no need to secure a space for accommodating screws and the like for fastening and fixing the heat exchange pressing member, and the dimension in the height direction of the device can be reduced.

Furthermore, according to the heat medium heating device of the present invention, in the heat medium heating device described above, boss portions each having a predetermined height for fastening and fixing the heat exchange pressing member are integrally formed at four corners on the inner bottom surface of the lower casing.

According to the present invention, the boss portions each having the predetermined height for fastening and fixing the heat exchange pressing member are integrally formed at four corners on the inner bottom surface of the lower casing. Accordingly, when the heat exchange pressing member is fastened and fixed to the boss portions at four corners, the heat exchange element can be pressed to be fastened and fixed to the inner bottom surface of the lower casing. Therefore, the flat heat exchange tubes and the PTC heaters, which constitute the heat exchange element, can be brought into close contact with each other. This makes it possible to reduce the contact thermal resistance to thereby improve the heat transfer efficiency, and to prevent leakage of the heat medium to thereby improve the reliability.

Furthermore, according to the heat medium heating device of the present invention, in any one of the heat medium heating devices described above, the joint portion provided on the heat exchange pressing member projects to an upper surface side thereof, and the heat medium outlet and inlet paths include an annular protrusion to which the heat medium outlet and inlet paths provided on the upper casing are fit and connected through a seal material.

According to the present invention, the joint portion provided on the heat exchange pressing member projects to the upper surface side thereof, and the heat medium outlet and inlet paths include the annular protrusion to which the heat medium outlet and inlet paths provided on the upper casing are fit and connected through the seal material. When the upper casing is overlaid on the lower casing to thereby connect and integrate the both casings, the heat medium outlet and inlet paths on the side of the upper casing are fit and connected to the annular protrusion projecting from the upper surface of the heat exchange pressing member. This makes it possible to form the flow passage for circulating the heat medium which communicates with the outlet/inlet header portion of each of the flat heat exchange tubes. Therefore, even when the heat medium outlet and inlet paths are provided on the side of the upper casing separate from the lower casing to which the heat exchange element is fastened and fixed, the flow passage for circulating the heat medium can be relatively easily formed without complication of the flow passage, with the heat exchange pressing member as a relay member.

Furthermore, according to the heat medium heating device of the present invention, in any of the heat medium heating devices described above, the control substrate includes two control substrates, a first control substrate and a second control substrate, which are connected through a connector; the first control substrate is a control substrate that is fixed and installed on an upper surface of the heat exchange pressing member and is connected with a terminal extending from an electrode plate constituting each of the PTC heaters; and a control circuit including a power transistor that controls energization to the PTC heaters is mounted thereon, and the second control substrate is a control substrate that is fixed and installed on an inner surface of the upper casing, and the power supply HV harness and the control LV harness are connectable thereto through a terminal, a connector or the like.

According to the present invention, the control substrate includes two control substrates, the first control substrate and the second control substrate, which are connected through the connector; the first control substrate is a control substrate that is fixed and installed on the upper surface of the heat exchange pressing member and is connected with the terminal extending from the electrode plate constituting each of the PTC heaters; and the control circuit including the power transistor that controls energization to the PTC heaters is mounted thereon, and the second control substrate is a control substrate that is fixed and installed on the inner surface of the upper casing, and the power supply HV harness and the control LV harness are connectable thereto through a terminal, a connector or the like. Accordingly, when the upper casing is overlaid on the lower casing to thereby connect and integrate the both casings, the first control substrate installed on the upper surface of the heat exchange pressing member on the side of the lower casing, and the second control substrate installed on the inside of the upper casing are connected through the connector, thereby making it possible to electrically connect the electrical device on the side of the lower casing and the electrical device on the side of the upper casing. Accordingly, the connection work of the electrical system between the control substrate, the power supply HV harness, and the control LV harness, and between the control substrate and the PTC heater can be facilitated.

Furthermore, according to the present invention, there is provided a vehicle air conditioner that allows a heat medium heated by a heat medium heating device to circulate with respect to a radiator disposed in an air flow passage. The heat medium heating device is any one of the heat medium heating devices described above.

According to the present invention, in the vehicle air conditioner that allows the heat medium heated by the heat medium heating device to circulate with respect to the radiator disposed in the air flow passage, the heat medium heating device is any one of the heat medium heating devices described above. Accordingly, the heat medium to be supplied to the radiator disposed in the air flow passage can be heated and supplied by the downsized, high-performance heat medium heating device described above. Accordingly, the on-board capability of the air conditioner with respect to a vehicle can be improved, and the air conditioning performance of the vehicle air conditioner, especially, the heating performance, can be improved.

According to the heat medium heating device of the present invention, the connection portion between the power supply HV harness and the control LV harness is disposed using the side space of the outer surface on which the heat medium outlet and inlet paths of the casing are provided. Further, the control substrate is disposed using the side space of the inner surface of the casing. This makes it possible to reduce the dimension in the height direction of the device including the heat medium outlet and inlet paths and the connection portion between the harnesses, and to dispose the connection portion between the harnesses and the control substrate can be disposed adjacent to each other on the inside and outside of the same surface of the casing. Accordingly, the heat medium heating device can be downsized and the on-board capability with respect to a vehicle can be improved. Moreover, the workability upon connection of the harnesses and the control substrate can be improved.

According to a vehicle air conditioner of the present invention, a heat medium to be supplied to a radiator disposed in an air flow passage can be heated and supplied by the downsized, high-performance heat medium heating device described above. Accordingly, the on-board capability of the air conditioner with respect to a vehicle can be improved, and the air conditioning performance of the vehicle air conditioner, especially, the heating performance can be improved.

DETAILED DESCRIPTION OF THE INVENTION

First Embodiment

Hereinafter, a first embodiment of the present invention will be described with reference to FIGS. 1 to 8.

Figure 1:
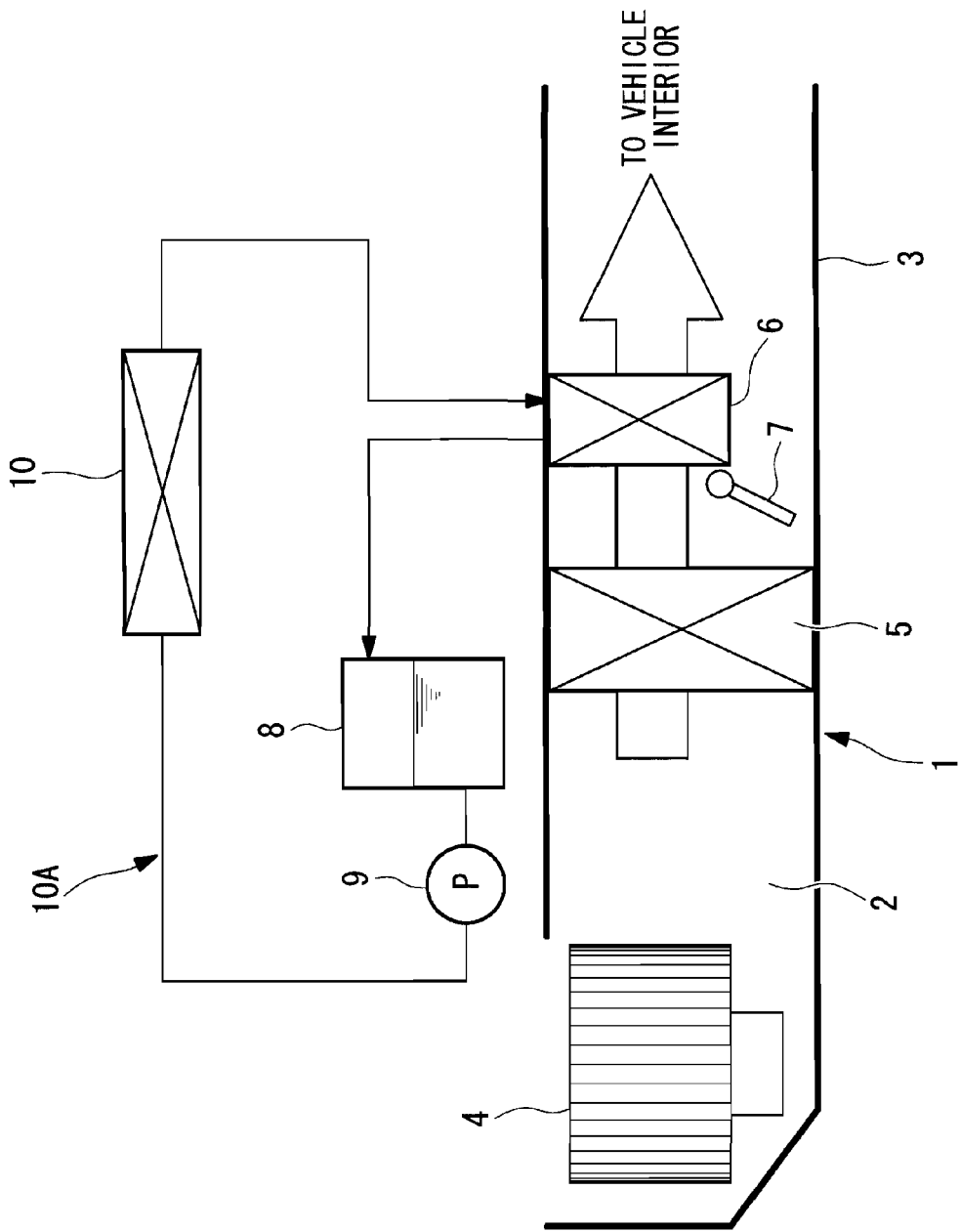
FIG. 1 is a schematic block diagram of a vehicle air conditioner including a heat medium heating device according to a first embodiment of the present invention.

FIG. 1 is a schematic block diagram of a vehicle air conditioner including a heat medium heating device according to the first embodiment of the present invention.

A vehicle air conditioner 1 includes a casing 3 that forms an air flow passage 2 for guiding external air or in-vehicle air into the vehicle interior after taking the air into the vehicle and controlling the temperature thereof.

The casing 3 includes a blower 4, a cooler 5, a radiator 6, and an air mix damper 7. The blower 4 sequentially intakes and pressurizes the external air or in-vehicle air from an upstream side to a downstream side of the air flow passage 2, and feeds the air by pressure to the downstream side. The cooler 5 cools the air which is pressure-fed by the blower 4. The radiator 6 heats the air passing through the cooler 5 and cooled. The air mix damper 7 adjusts the flow rate ratio between the amount of air passing through the radiator 6 and the amount of air bypassing the radiator 6, and mixes it with air on the downstream side, thereby adjusting the temperature for temperature control wind.

The downstream side of the casing 3 is connected to a plurality of air outlets for blowing out the temperature-controlled air in the vehicle interior through a blowout mode switching damper and a duct which are not illustrated.

The cooler 5 constitutes a coolant circuit with a compressor, a condenser, an expansion valve, and the like which are not illustrated, and evaporates the coolant subjected to adiabatic expansion by the expansion valve, thereby cooling the air passing therethrough. The radiator 6 constitutes a heat medium circulation circuit 10A with a tank 8, a pump 9, and a heat medium heating device 10, and allows the heat medium (for example, antifreeze, or water) which is heated to a high temperature by the heat medium heating device 10 to circulate through the pump 9, thereby heating the air passing therethrough.

Figure 2:
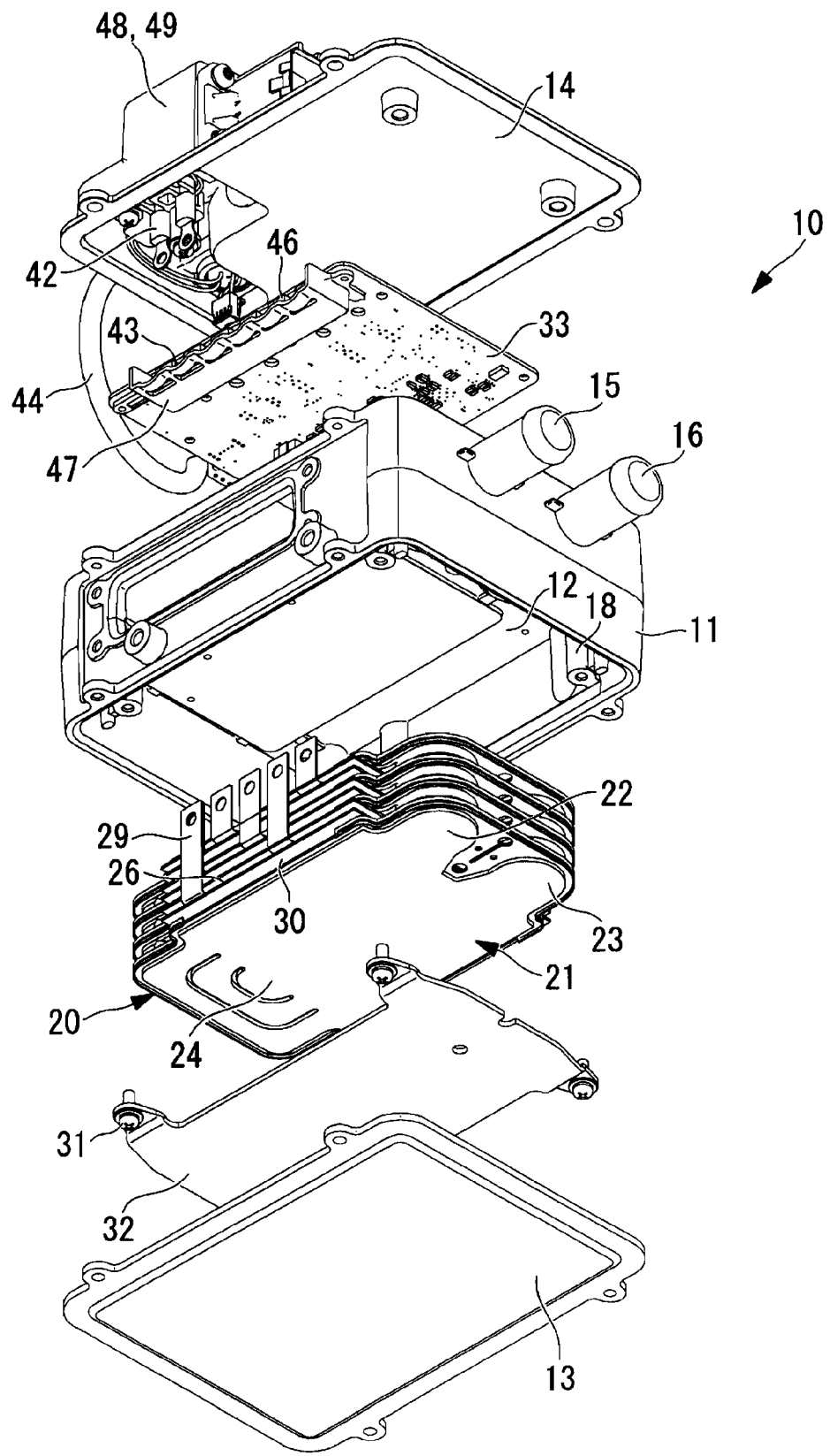
FIG. 2 is an exploded perspective view of the heat medium heating device illustrated in FIG. 1.
Figure 3:
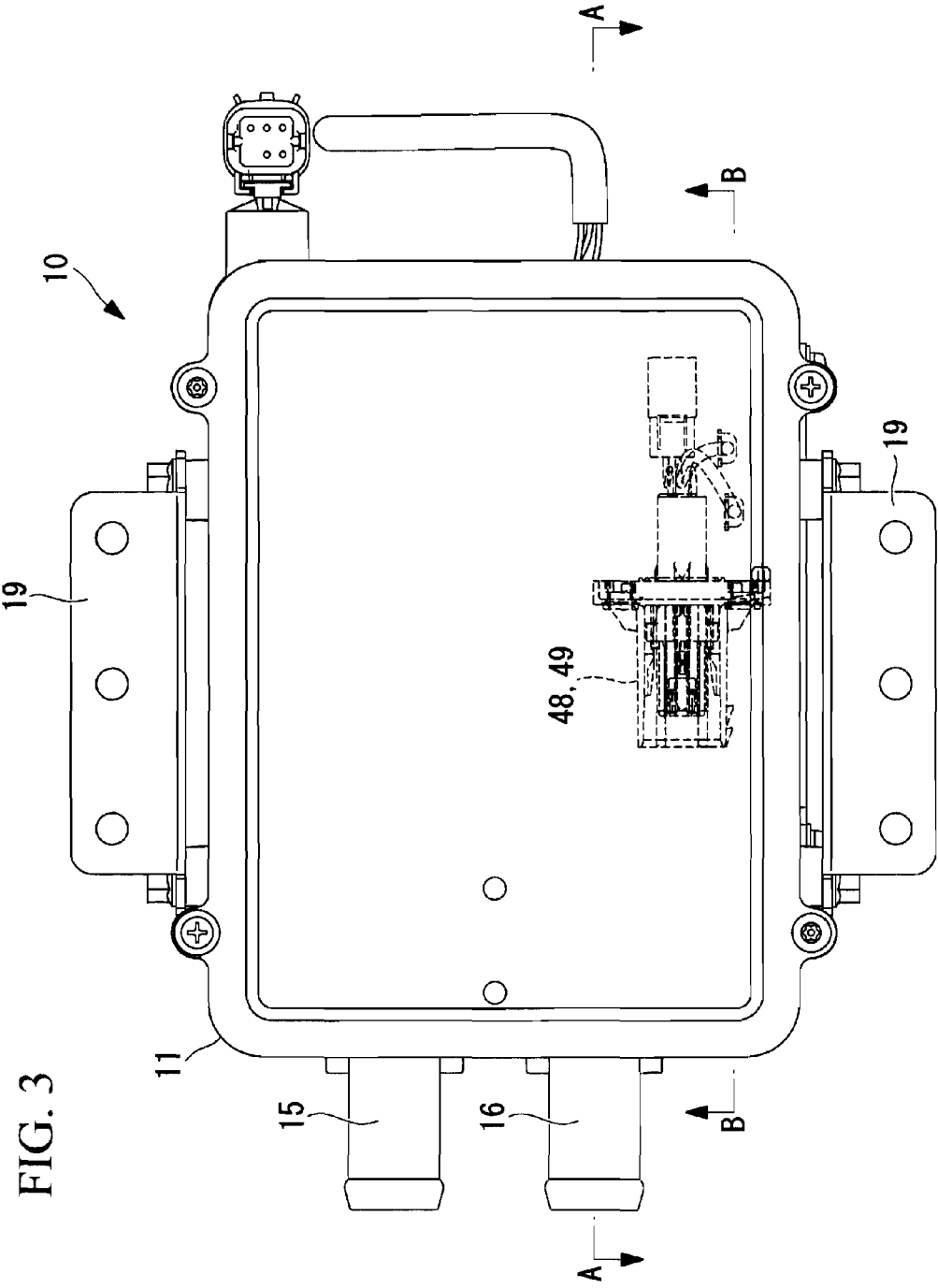
FIG. 3 is a plan view of the heat medium heating device illustrated in FIG. 2.
Figure 4:
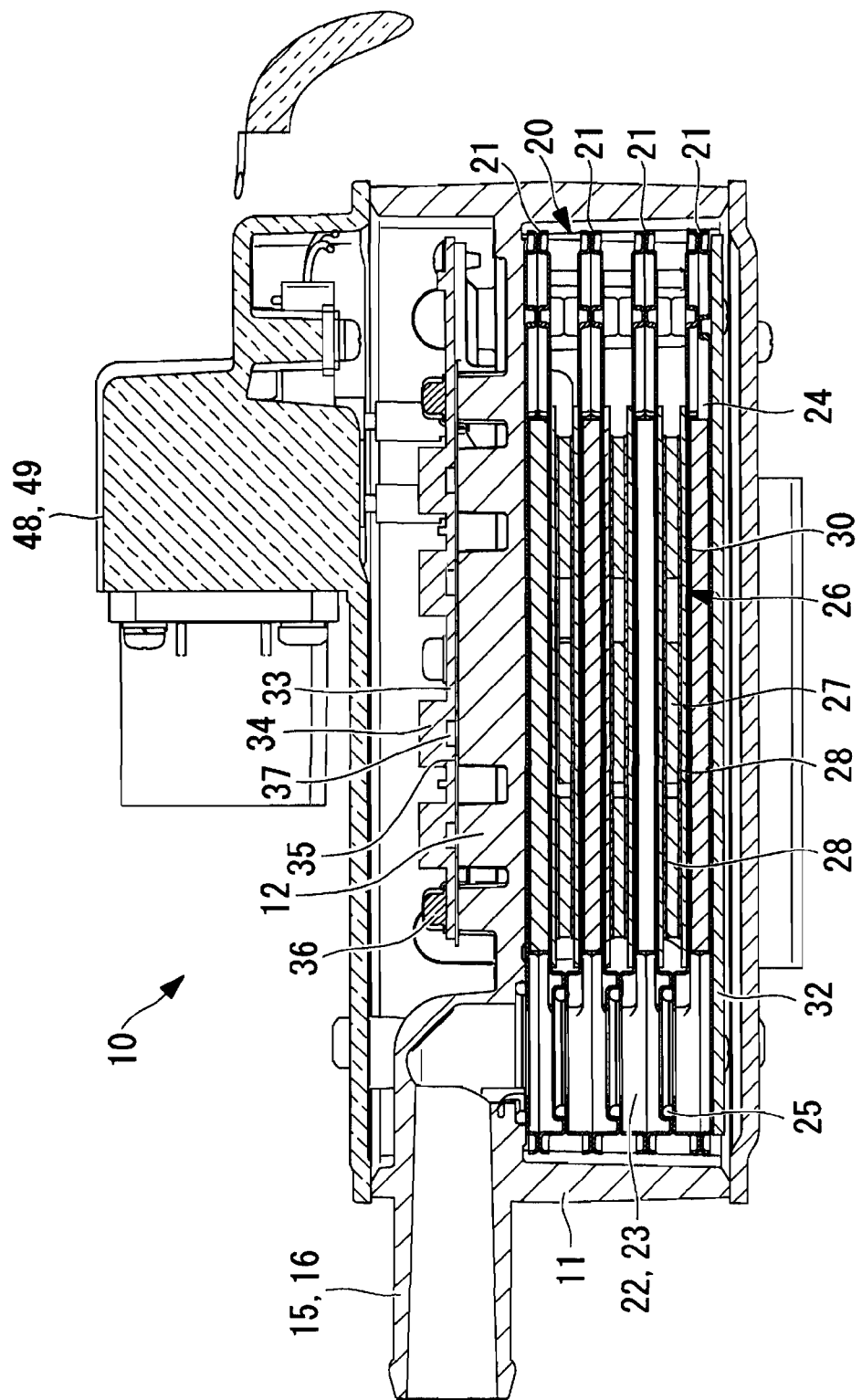
FIG. 4 is an equivalent diagram taken along the line A-A of FIG. 3.
Figure 5:
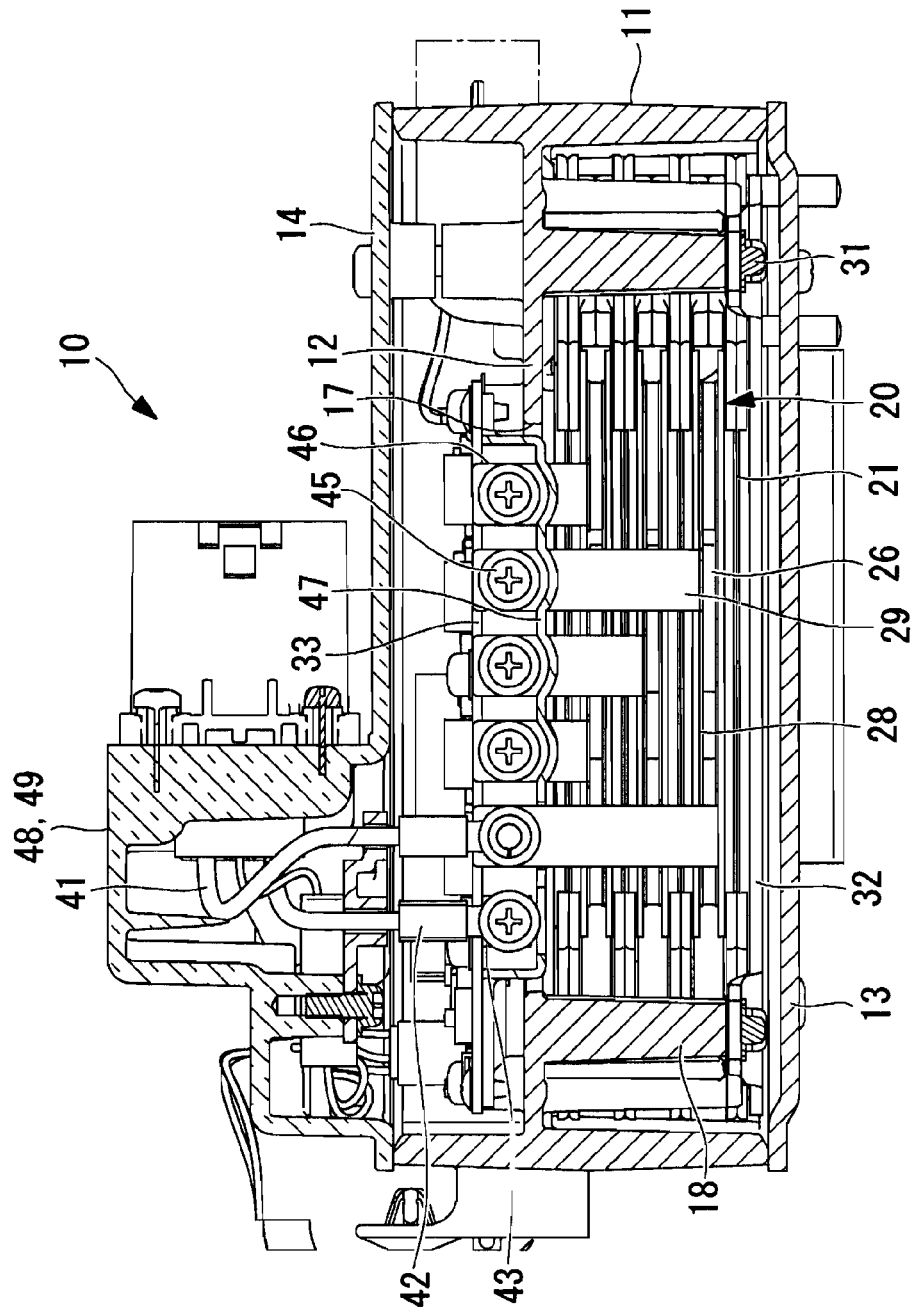
FIG. 5 is an equivalent diagram taken along the line B-B of FIG. 3.

FIG. 2 is an exploded perspective view of the heat medium heating device 10 illustrated in FIG. 1. FIG. 3 is a plan view of the heat medium heating device 10. FIG. 4 is an equivalent diagram taken along the line A-A of FIG. 3. FIG. 5 is an equivalent diagram taken along the line B-B of FIG. 3.

The heat medium heating device 10 includes a casing 11 which is opened at the bottom surface and the upper surface and is made by aluminum die casting with a square shape in which a partition wall 12 is provided. The bottom surface of the casing 11 is sealed with a bottom plate 13 which is coupled with a screw. Further, the upper surface of the casing 11 is sealed with an upper plate 14 which is coupled with a screw.

The casing 11 protrudes upward from the upper surface side (the other surface side) of the partition wall 12, and a pair of paths, i.e., a heat medium inlet path 15 and a heat medium outlet path 16, which extend to the side, are integrally formed. The heat medium outlet and inlet paths 15 and 16 are opened to the bottom surface side (one surface side) of the partition wall 12 through the partition wall 12. On the partition wall 12, through-holes 17 (see FIG. 5) penetrating through a plurality of terminals 29 described later is provided along one side, boss portions 18 each having a predetermined height are integrally formed at four corners on the bottom surface side. These boss portions 18 are used to fasten and fix a heat exchange pressing member 32 described later. An installing bracket 19 of the heat medium heating device 10 is detachably mounted on the outer peripheral surface of the casing 11.

A heat exchange element 20 is incorporated into the bottom surface side (one surface side) of the partition wall 12 of the casing 11. The heat exchange element 20 is obtained by alternately stacking a plurality of flat heat exchange tubes 21 and a plurality of pairs of PTC heaters 26 in multiple layers, the plate-like heat exchange pressing member 32 to be fastened and fixed to the boss portions 18 through screws 31 is fastened and fixed to be pressed against the partition wall 12 so that they are installed to be brought into close contact with each other.

Each of the flat heat exchange tubes 21 is a tube having a thickness of about several millimeters and obtained by superimposing and brazing a pair of molding plates that are formed by press-molding a thin plate made of an aluminum alloy. Each of the flat heat exchange tubes 21 includes a flat tube portion 24 which is provided with an inlet header portion 22 and an outlet header portion 23 on one end side, and forms a U-turn flow passage that extends from the inlet header portion 22 and U-turned at the other end side and reaches the outlet header portion 23. A corrugated inner fin (not illustrated) is inserted in the U-turn flow passage of the flat tube portion 24. The outlet/inlet header portions 22 and 23 are provided with a communication hole for allowing the outlet/inlet header portions 22 and 23 of the neighboring flat heat exchange tubes 21 to communicate with each other. The surrounding of the communication hole is sealed with a seal material 25 such as an O-ring.

The PTC heaters 26 are formed of a PTC element 27 and a pair of electrode plates 28 stacked on both surfaces of the PTC element 27, and is formed in a plate shape with a rectangular shape. The PTC heaters 26 are stacked in a sandwich shape between the flat tube portions 24 of the flat heat exchange tubes 21. Each electrode plate 28 is provided with the terminal 29 extending from one side of each electrode plate 28 and folded above in an L-shape. This terminal 29 is formed to pass through the through-holes 17 of the partition wall 12 and extend upward. The PTC heaters 26 are stacked between the flat tube portions 24 through an insulating film, a heat conductive sheet 30, and the like.

The heat exchange element 20 has a structure in which the outlet/inlet header portions 22 and 23 of the flat heat exchange tubes 21 penetrate through the partition wall 12 and communicate and connect with the heat medium outlet and inlet paths 15 and 16 that are opened on the bottom surface side (one surface side) of the partition wall 12, and the seal material 25 such as an O-ring is interposed in the connection portion, thereby incorporating the heat exchange element 20. After the heat exchange element 20 is incorporated, the opening on the bottom surface side of the casing 11 is sealed with the bottom plate 13.

On the upper surface side (the other surface side) of the partition wall 12 of the casing 11, a control substrate 33 that controls energization to the PTC heaters 26 by using a side space (dead space) of the heat medium outlet and inlet paths 15 and 16 is fixed and installed. The control substrate 33 has a structure in which a plurality of power transistors (hereinafter referred to as "exothermic electrical components 34") and control circuits, such as an IGBT, which control energization to the PTC heaters 26 are mounted on the surface and are fastened and fixed with screws 36 to the upper surface of the partition wall 12 through an insulating sheet (film) 35 or the like. The exothermic electrical components (power transistors) 34 on the control substrate 33 can be cooled with the partition wall 12, which is adjacent to the flat heat exchange tubes 21 of the heat exchange element 20, as a heat sink. The partition wall 12 is made of an aluminum alloy in this case.

Figure 6:
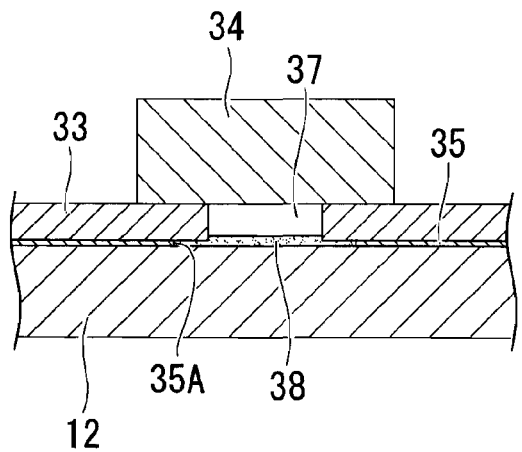
FIG. 6 is a partial longitudinal sectional view of a portion for installing an exothermic electrical component mounted on a control substrate illustrated in FIG. 4.
Figure 7:
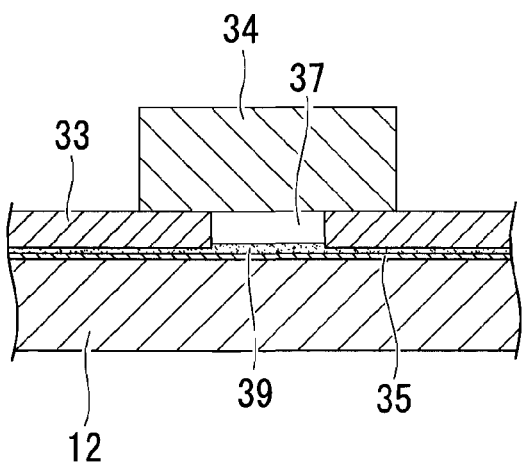
FIG. 7 is a partial longitudinal sectional view of a modified example of the exothermic electrical component mounted on the control substrate illustrated in FIG. 4.

The exothermic electrical components 34 are mounted on the surface of the control substrate 33, and employ a structure as illustrated in FIG. 6 or 7 so as to radiate the generated heat to the partition wall 12 on the back surface side and cool the electrical components.

A heat penetration portion 37 made of a high heat-conductive material, such as copper or aluminum, is provided to penetrate from the surface side to the back surface side so as to correspond to a portion in which the exothermic electrical components 34 of the control substrate 33 are installed. The heat generated from the exothermic electrical components 34 is transferred to the back surface side of the control substrate 33 through the heat penetration portion 37. Thus, there are manufacturing variations in the amount of retraction or projection from the back surface of the control substrate 33 of the heat penetration portion 37. Accordingly, there is no guarantee that the heat penetration portion 37 normally contacts the partition wall 12 and the heat conductive insulating sheet 35. In this case, the heat radiation properties and electrical insulating properties of the control substrate 33 are not secured.

As illustrated in FIG. 6, a plurality of openings 35A is provided in a portion corresponding to the heat penetration portion 37 of the insulating sheet 35. A heat conductive liquid gap material (heat conductive insulator) 38 made of an insulating heat conductive material is interposed in the openings 35A to absorb manufacturing variations of the heat penetration portion 37, and are thermally connected reliably while the heat penetration portion 37 and the partition wall 12 hold the electrical insulating properties. As the heat conductive liquid gap material 38 having insulating properties, there are known, for example, heat conductive silicone elastomer obtained by using silicone as a base resin, and fiber glass, alumina, or the like as a core and filler, a solid heat conductive liquid gap material, and a heat conductive liquid gap material cured from a liquid form. The heat conductive liquid gap material 38 function functions as a moldable elastic body after being cured from a liquid form or in a solid state.

In this embodiment, on the premise that the heat conductive liquid gap material 38 cured from the liquid form is used, the openings 35A are formed in the insulating sheet 35 and the openings 35A have an area larger than the area of the heat penetration portion 37. As a result, even when the partition wall 12, the control substrate 33, the insulating sheet 35, and the like are relatively misaligned due to integration of the dimensional tolerance, the heat conductive liquid gap material 38 interposed in the openings 35A and the heat penetration portion 37 are reliably aligned. In this case, the insulating sheet 35 need not have heat conductivity, and a hard sheet having electrical insulating properties and exclusively used for insulation, for example, a sheet such as a polyimide film, may be used.

In this embodiment described above, the insulating sheet 35 is provided with the openings 35A and the heat conductive liquid gap material 38 is filed in the openings 35A. Alternatively, it is possible to employ, instead of the heat conductive liquid gap material 38, a structure in which a low-hardness insulating heat conductive sheet (heat conductive insulator) 39 is interposed in a portion corresponding to the heat penetration portion 37 between the insulating sheet 35 and the control substrate 33, as illustrated in FIG. 7, so as to absorb the manufacturing variations and transfer heat. As the low-hardness insulating heat conductive sheet (heat conductive insulator) 39, a soft, low-hardness silicone sheet that can be deformed depending on the variations, and the like can be used. Note that in this case, there is no need to provide the openings 35A in the heat conductive insulating sheet 35.

Figure 8:
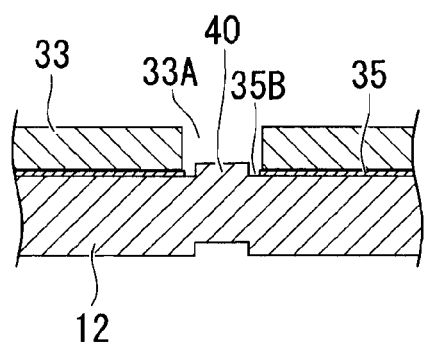
FIG. 8 is a partial longitudinal sectional view of a portion for positioning an insulating sheet installed in the partition wall illustrated in FIG. 4 and the control substrate.

Furthermore, as described above, the control substrate 33 is fastened and fixed to the upper surface side (the other surface side) of the partition wall 12 with the plurality of screws 36 through the insulating sheet 35. However, the control substrate 33 and the insulating sheet 35 are desirably positioned and incorporated in the upper surface of the partition wall 12. As illustrated in FIG. 8, protrusions 40 that project above at a plurality of positions of the upper surface of the partition wall 12 are provided, and fitting holes 35B and 33A for positioning, which are fit into the protrusions 40, are provided on the side of the insulating sheet 35 and/or control substrate 33. Thus, the position of the heat penetration portion 37 on the side of the control substrate 33 and the heat conductive liquid gap material 38 for heat radiation can be reliably aligned to be assembled.

The control substrate 33 is provided with a plurality of terminal boards 43, which is connected with leading edge terminals 42 of a power supply HV harness 41 branched into two parts on one side, and a connector (not illustrated) which is connected with a control LV harness 44, for example. Further, a plurality of terminal boards 46 to which the terminals 29 extending from the electrode plates 28 are directly connected through screws 45 is aligned in series. The plurality of terminals 29 extending from the electrode plates 28 penetrate through grommets 47, and the grommets 47 are fit into the respective through-holes 17 of the partition wall 12 and thus are positioned with respect to the plurality of terminal boards 46.

The opening on the side of the upper surface of the casing 11 fixes and installs the control substrate 33 on the partition wall 12, and the terminals 29 extending from the electrode plates 28 are screwed by the screws 45 and connected to the terminal boards 46 of the control substrate 33. Further, the power supply HV harness 41 and the control LV harness 44, which extend from the side of the upper plate 14, are connected to the terminal boards 43 and the connector and are then sealed with the upper plate 14.

The upper plate 14 is provided with connection portions 48 and 49 of the power supply HV harness 41 and the control LV harness 44 in a space on the side opposite to the direction in which the heat medium outlet and inlet paths 15 and 16 of the upper surface extend. A cable or harness (not illustrated) is connectable from a power supply and an upper control device (ECU). A power or signal input through the connection portions 48 and 49 is input to the control substrate 33 through the HV harness 41 and the LV harness 44 and is applied to the PTC heaters 26 through the control substrate 33.

In the heat medium heating device 10 described above, while the heat medium flowing from the heat medium inlet path 15 of the casing 11 circulates in the flat tube portion 24 through the inlet header portion 22 of each of the plurality of flat heat exchange tubes 21 constituting the heat exchange element 20 and circulates in the U-turn flow passage of the flat tube portion 24, the heat medium is heated and increased in temperature by the PTC heaters 26 and flown out to the outlet header portion 23, and is sent to the outside therefrom through the heat medium outlet path 16, thereby circulating the flow passage. The heat medium flown out from the heat medium heating device 10 is supplied to the radiator 6 through the heat medium circulation circuit 10A (see FIG. 1), which contributes to heating.

On the other hand, the power from the power supply HV harness 41 connected to the connection portion 48 of the upper plate 14 is applied to the PTC heaters 26 through the control substrate 33. The control substrate 33 receives a control signal through the control LV harness 44 connected to the connection portion 49, and controls switching of the power applied to the plurality of pairs of PTC heaters 26 through a switching circuit formed of a control circuit and a plurality of power transistors such as an IGBT, and controls the heating amount. In this case, the heat generated from the exothermic electrical components (power transistors) 34 is conducted to the partition wall 12 of the casing 11 made by aluminum die casting. Further, the partition wall 12 is used as a heat sink, and the heat medium flowing in the flat heat exchange tubes 21 is cooled by the heat sink.

In other words, the heat generated from the exothermic electrical components 34 mounted on the surface of the control substrate 33 is transferred to the back surface side of the control substrate 33 through the heat penetration portion 37. The heat radiated to the partition wall 12 serving as the heat sink through the heat conductive insulator, such as the heat conductive liquid gap material 38 or the low-hardness insulating heat conductive sheet 39, and the heat conductive insulating sheet 35, which are in contact with the heat penetration portion 37, so that the exothermic electrical components 34 are cooled by the heat medium flowing in the flat heat exchange tubes 21.

On the other hand, the heat generated by the PTC heaters 26 is transferred to the plurality of flat heat exchange tubes 21 through the heat conductive sheet 30 and the like, which contributes to the heating of the heat medium flowing in the flat heat exchange tubes. Here, the PTC heaters 26 and the flat heat exchange tubes 21 are pressed through the heat exchange pressing member 32 and brought into close contact with each other. Accordingly, the contact thermal resistance therebetween is reduced and the heat transfer efficiency is improved. Thus, the heat medium can be efficiently heated, thereby achieving the high-performance, downsized heat medium heating device 10.

Fastening of the heat exchange pressing member 32 allows the seal material 25, such as an O-ring, which is interposed in the surrounding of the communication hole of the outlet/inlet header portions 22 and 23 of each of the flat heat exchange tubes 21, to be reliably brought into close contact. Accordingly, the sealing properties around the outlet/inlet header portions 22 and 23 of each of the flat heat exchange tubes 21 can be secured and leakage of the heat medium can be reliably prevented, thereby making it possible to increase the quality and reliability of the heat medium heating device 10.

Furthermore, in this embodiment, the connection portions 48 and 49 of the power supply HV harness 41 and the control LV harness 44 are provided on the outer surface on the same surface side as the surface on which the heat medium outlet and inlet paths 15 and 16 of the casing 11 are provided. Further, the control substrate 33 that controls energization to the PTC heaters 26 is disposed in the inside of the same surface as the surface on which the connection portions 48 and 49 of the casing 11 are provided. Thus, the connection portions 48 and 49 of the power supply HV harness 41, the control LV harness 44, and the like can be disposed using a side space of the outer surface on which the heat medium outlet and inlet paths 15 and 16 of the casing 11 are provided. Further, the control substrate 33 can be disposed using a side space of the inner surface of the casing 11.

This makes it possible to reduce the dimension in the height direction of the heat medium heating device 10 including the heat medium outlet and inlet paths 15 and 16 and connection portions 48 and 49 of the harness, and also makes it possible to dispose the connection portions 48 and 49 of the harness and the control substrate 33 on one surface side of the casing 11. Accordingly, the heat medium heating device 10 can be downsized and the on-board capability with respect to a vehicle can be improved. In addition, the workability upon connection of the harnesses 41 and 44 and the control substrate 33 can be improved.

Further, the structure is employed in which the partition wall 12 is provided in the casing 11. The heat exchange element 20 is pressed to be fastened and fixed to the one surface side of the partition wall 12 by the heat exchange pressing member 32, and the outside thereof is sealed with the bottom plate 13. The control substrate 33 is installed in the other surface side of the partition wall 12, and the outside thereof is sealed with the upper plate 14 including the connection portions 48 and 49.

Accordingly, the heat exchange element 20 is fastened and fixed to the casing 11 provided with the partition wall 12 formed therein at one surface side thereof with the partition wall 12 interposed therebetween. The control substrate 33 is installed on the other surface side, and the both sides thereof are sealed with the bottom plate 13 and the upper plate 14, thereby making it possible to accommodate and install the heat exchange element 20 and the control substrate 33 in the casing 11. Accordingly, the PTC heaters 26 of the heat exchange element 20, the control substrate 33, and the harness connection portions 48 and 49, which require electrical connection, can be disposed adjacent to each other. Therefore, the work for electrical connection therebetween can be facilitated and the workability can be improved.

Furthermore, a control circuit including the exothermic electrical components 34 that control the PTC heaters 26 is mounted on the control substrate 33, and the exothermic electrical components 34 are mounted so as to be cooled with the partition wall 12 as a heat sink. Thus, the exothermic electrical components 34 including power transistors, such as an IGBT, which are mounted on the control substrate 33 installed on the other surface side of the partition wall 12 can be efficiently cooled using the heat exchange element 20, which is fastened and fixed to the one surface side of the partition wall 12, as a cooling source, with the partition wall 12 as a heat sink. Accordingly, the reliability of the cooling performance with respect to the heat of the control substrate 33 including the exothermic electrical components 34 can be secured and the operation thereof can be stabilized.

The control substrate 33 is provided with the heat penetration portion 37 which is made of a high heat-conductive material penetrating through the front and back surfaces so as to correspond to the mounting position of the exothermic electrical components 34. The exothermic electrical components 34 can be cooled through the heat penetration portion 37 with the partition wall 12 as a heat sink. Accordingly, the heat generated from the exothermic electrical components 34 mounted on the surface of the control substrate 33 is transferred to the back surface side through the heat penetration portion 37 made of a high heat-conductive material such as copper, and is further transferred to the partition wall 12 serving as the heat sink from the heat penetration portion 37. This makes it possible to efficiently cool the exothermic electrical components through the partition wall 12 with the heat exchange element 20 as a cooling source. Accordingly, the heat-resistant properties of the control substrate 33 including the exothermic electrical components 34 can be improved and the operation thereof can be stabilized.

In this embodiment, the heat conductive insulators, such as the heat conductive liquid gap material 38 and the low-hardness insulating heat conductive sheet 39, are interposed between the heat penetration portion 37 of the control substrate 33 and the partition wall 12. Therefore, even when there are manufacturing variations in the amount of retraction or projection from the back surface of the control substrate 33 of the heat penetration portion 37, the heat generated from the exothermic electrical components 34 can be reliably transferred to the partition wall 12 through the heat penetration portion 37 and the heat conductive insulators, such as the heat conductive liquid gap material 38 and the low-hardness insulating heat conductive sheet 39, regardless of the variations, thereby making it possible to cool the exothermic electrical components 34 with the partition wall 12 as a heat sink. Accordingly, the heat radiation properties and electrical insulating properties of the control substrate 33 mounted on the surface of the exothermic electrical components 34 can be secured, thereby making it possible to stabilize and improve the quality of the heat medium heating device 10.

Furthermore, the control substrate 33 is disposed on the upper surface of the partition wall 12 through the insulating sheet 35, and the openings 35A are provided in the insulating sheet 35 so as to correspond to the portion in which the heat conductive liquid gap material 38 is interposed. Accordingly, the heat conductive liquid gap material 38 is filled or disposed in the openings 35A of the insulating sheet 35 to assemble the control substrate 33, and the heat penetration portion 37 on the side of the control substrate 33 and the heat conductive liquid gap material 38 are aligned. This makes it possible to radiate the heat generated from the exothermic electrical components 34 directly to the partition wall 12 through the heat penetration portion 37 and the heat conductive liquid gap material 38, regardless of the amount of retraction or projection from the heat penetration portion 37.

Also when a heat conductive liquid gap material cured from a liquid form is used instead of a solid form as the heat conductive liquid gap material 38, the heat conductive liquid gap material can be filled and held in the openings 35A. Accordingly, the heat radiation path from the exothermic electrical components 34 can be reliably secured and the cooling performance thereof can be enhanced. In this case, a hard sheet exclusively used for insulation, for example, a sheet such as a polyimide film, may be used as the insulating sheet 35, which contributes to a reduction in cost. Further, the openings 35A have an area larger than the area of the heat penetration portion 37. Thus, even when the partition wall 12, the control substrate 33, the insulating sheet 35, and the like are misaligned due to integration of the dimensional tolerance, the heat penetration portion 37 and the heat conductive liquid gap material 38 can be reliably aligned and the heat radiation path from the exothermic electrical components 34 can be reliably formed, thereby improving the cooling performance thereof.

Furthermore, in this embodiment, the plurality of protrusions 40 is provided on the upper surface of the partition wall 12, and the fitting holes 35B and 33A on the side of the insulating sheet 35 and/or control substrate 33 are fit to the protrusions 40, thereby enabling positioning of the insulating sheet 35 and/or control substrate 33. Therefore, upon assembly of the insulating sheet 35 and/or control substrate 33, the fitting holes 35B and 33A on the side of the insulating sheet 35 and/or control substrate 33 are fit to the protrusions 40 on the side of the partition wall 12, thereby reliably positioning and positioning the insulating sheet 35 and/or control substrate 33. Accordingly, the position of the heat penetration portion 37 on the side of the control substrate 33 and the heat conductive liquid gap material 38 for heat radiation can be reliably aligned, thereby improving the assembly accuracy and assembly workability.

At least the portion serving as the heat sink of the partition wall 12 is made of an aluminum alloy. Accordingly, the heat generated from the exothermic electrical components 34 mounted on the control substrate 33 is transferred to the partition wall 12, which is made of an aluminum alloy with high heat conductivity and light weight, through the heat conductive insulators, such as the heat penetration portion 37, the insulating sheet 35 and/or heat conductive liquid gap material 38, and the low-hardness insulating heat conductive sheet 39, and is radiated to the partition wall with the heat exchange element 20 as a cooling source, thereby making it possible to cool the exothermic electrical components 34. Accordingly, the cooling performance of the exothermic electrical components 34 mounted on the surface of the control substrate 33 can be enhanced with the partition wall 12 as a heat sink. Further, the reliability with respect to the heat resistance can be improved and light weight can be maintained.

Furthermore, in this embodiment, on the one surface side of the partition wall 12, the boss portions 18 each having a predetermined height for fastening and fixing the heat exchange pressing member 32 are integrally formed at four corners. The heat exchange pressing member 32 is fastened and fixed to the boss portions 18 at four corners with the screws 31, thereby making it possible to press the heat exchange element 20 against the partition wall 12 of the casing 11 to fasten and fix the heat exchange element 20. Accordingly, the flat heat exchange tubes 21 and the PTC heaters 26, which constitute the heat exchange element 20, are brought into close contact with each other, and the outlet/inlet header portions 22 and 23 of the plurality of flat heat exchange tubes 21 are also brought into close contact with each other. This makes it possible to reduce the contact thermal resistance to thereby improve the heat transfer efficiency, and to prevent leakage of the heat medium to thereby improve the reliability.

The outlet and inlet paths 15 and 16 for the heat medium extend from the upper surface side (the other surface side) of the partition wall 12, and penetrates through the partition wall 12 and is opened to the bottom surface side (one surface side) on which the heat exchange element 20 is fixed and installed, thereby enabling communication with the outlet/inlet header portions 22 and 23 of the flat heat exchange tubes 21. Accordingly, the outlet/inlet header portions 22 and 23 of the flat heat exchange tubes 21 of the heat exchange element 20 incorporated in one surface side of the partition wall 12 communicate with the opening of the partition wall 12 through the seal material 25 around the communication hole, thereby enabling communication and connection with the heat medium outlet and inlet paths 15 and 16 on the side of the casing 11. Accordingly, also when the structure is employed in which the heat medium outlet and inlet paths 15 and 16 extend from the partition wall 12, the outlet/inlet header portions 22 and 23 of the flat heat exchange tubes 21 are allowed to communicate with each other through one seal material 25. Therefore, the flow passage for circulating the heat medium can be easily formed without complication of the flow passage.

The partition wall 12 is provided with the through-holes 17 penetrating through the terminals 29 extending from the electrode plates 28 constituting each of the PTC heaters 26. The terminals 29 is connectable to the terminal boards 46 of the control substrate 33 disposed on the other surface side with the partition wall 12 interposed therebetween. Therefore, even when the control substrate 33 and the heat exchange element 20 are opposite sides with the partition wall 12 interposed therebetween, the terminals 29 extending from the electrode plates 28 constituting the PTC heaters 26 project to the opposite side through the through-hole 17 provided in the partition wall 12, and thus can be directly connected to the terminal boards 46 of the control substrate 33. Accordingly, the PTC heaters 26 and the control substrate 33 can be electrically connected easily, regardless of the presence or absence of the partition wall 12.

Furthermore, the terminals 29 described above penetrate through the grommets 47, which are fit and installed in the through-holes 17, and can be positioned through the grommets 47. Accordingly, in the case where the terminals 29 extending from the electrode plates 28 of the PTC heaters 26 project to the opposite side through the through-holes 17 formed in the partition wall 12, the terminals 29 can be positioned through the grommets 47 installed in the through-holes 17. Thus, the terminals can be aligned so as to prevent misalignment with respect to the terminal boards 46 of the control substrate 33, and the connection work thereof can be facilitated.

According to the vehicle air conditioner 1 of this embodiment, the heat medium supplied to the radiator 6 disposed in the air flow passage 2 can be heated and supplied by the downsized, high-performance heat medium heating device 10 as described above. Consequently, the on-board capability of the air conditioner 1 with respect to a vehicle can be improved and the air conditioning performance of the vehicle air conditioner 1, especially, the heating performance, can be improved.

Second Embodiment

Figure 9:
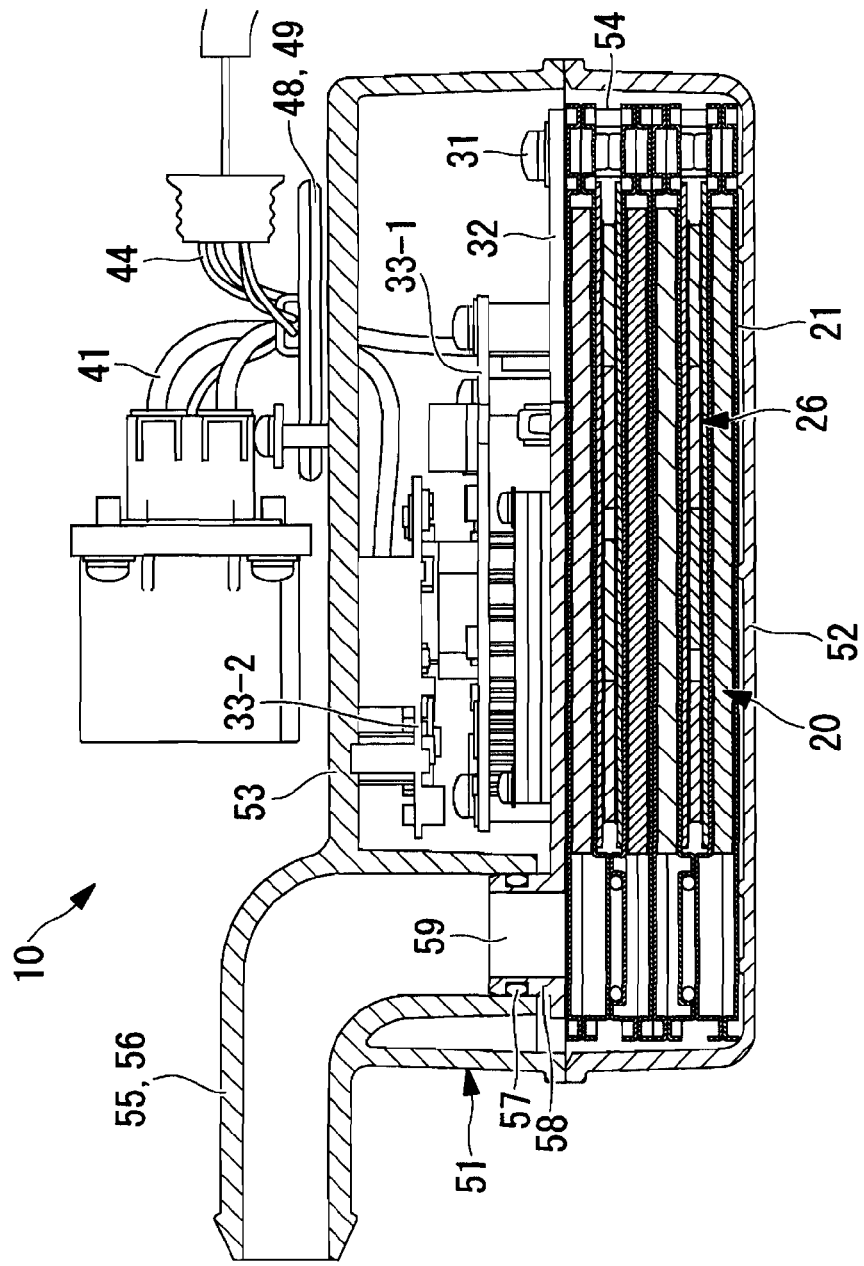
FIG. 9 is an equivalent diagram illustrating a longitudinal surface of a heat medium heating device according to a second embodiment of the present invention.

Next, a second embodiment of the present invention will be described with reference to FIG. 9.

This embodiment is different from the first embodiment described above in the structure of the casing, the pressing structure of the heat exchange element 20, and the structure of the control substrate. The other components are similar to those of the first embodiment, so the description thereof is omitted.

In this embodiment, a casing 51 includes a lower casing 52 and an upper casing 53 which are made by aluminum die casting and have a half-divided structure. The lower casing 52 and the upper casing 53 are integrally coupled together.

In the upper casing 53, a pair of a heat medium inlet path 55 and a heat medium outlet path 56 which have one end projecting downward in the inside and the other end protruding upward and which extend to the side. In a space of the upper surface on the side opposite to the indirection in which the heat medium outlet and inlet paths 55 and 56 of the upper casing 53 extend, the connection portions 48 and 49 of the power supply HV harness 41 and the control LV harness 44 are provided.

In the lower casing 52, the heat exchange element 20 having a structure in which the plurality of flat heat exchange tubes 21 and the plurality of pairs of PTC heaters 26 are alternately stacked in multiple layers is stacked to be accommodated and installed on the inner bottom surface. The heat exchange element 20 is pressed to be fastened and fixed to the inner bottom surface of the lower casing 52 by the heat exchange pressing member 32 which is fastened and fixed to boss portions 54, each of which has a predetermined height and is integrally formed at four corners in the lower casing 52, through the screws 31.

The heat exchange pressing member 32 is formed of a plate material made of an aluminum alloy. A joint portion 58 that fits and connects the heat medium outlet and inlet paths 55 and 56 through a seal material 57, such as an O-ring, is integrally formed on one end side. This joint portion 58 is an annular protrusion (joint portion 58) projecting upward from the upper surface of the heat exchange pressing member 32. A through-hole 59 that communicates with the outlet/inlet header portions 22 and 23 of the flat heat exchange tubes 21, and the heat medium outlet and inlet paths 55 and 56, which are provided in the upper casing 53, are fit and connected through the seal material 57 on the outer periphery.

In a side space of the heat medium outlet and inlet paths 55 and 56 within the upper casing 53, the control substrate is divided into two control substrates, i.e., a first control substrate 33-1 and a second control substrate 33-2 which are disposed in the upper and lower positions. The first control substrate 33-1 has a structure in which power transistors and control circuits such as an IGBT are mounted as the exothermic electrical components 34, and is fixed and installed with screws on the upper surface of the heat exchange pressing member 32. The heat generated from the power transistors is radiated to the heat exchange element 20 through the heat exchange pressing member 32. As in the first embodiment, on the first control substrate 33-1, the terminals 29 extending from the electrode plates 28 of the PTC heaters 26 are directly connected to the terminal boards 46.

The second control substrate 33-2 is fixed and installed through screws on the inner surface of the upper casing 53, and is connected with the power supply HV harness 41 through a top-type terminal (not illustrated). The control LV harness 44 is connected through a connector (not illustrated). The second control substrate 33-2 and the first control substrate 33-1 are connectable with each other through the connector.

As described above, according to this embodiment, the casing 51 includes the lower casing 52 to which the heat exchange element 20 is pressed to be fastened and fixed to the inner bottom surface through the heat exchange pressing member 32, and the upper casing 53 which is provided with the connection portions 48 and 49 between the heat medium outlet and inlet paths 55 and 56 and the harnesses 41 and 44. The two control substrates, i.e., the first control substrate 33-1 and the second control substrate 33-2, are disposed in the side space (deal space) between the inner surface of the upper casing 53 and the upper surface of the heat exchange pressing member 32. Further, the heat exchange pressing member 32 is provided with the through-hole 59 communicating with the outlet/inlet header portions 22 and 23 of the flat heat exchange tubes 21, and the joint portion 58 that allows the through-hole 59 to communicate and connect with the heat medium outlet and inlet paths 55 and 56, which are provided on the side of the upper casing 51, is integrally formed.

Accordingly, the heat exchange element 20 is pressed to be fastened and fixed to the inner bottom surface of the lower casing 52 by the heat exchange pressing member 32. Further, the two control substrates, i.e., the first control substrate 33-1 and the second control substrate 33-2, are disposed between the heat exchange pressing member 32 and the inner surface of the upper casing 53 in which the heat medium outlet and inlet paths 55 and 56 and the connection portions 48 and 49 of the harnesses are provided. Furthermore, the heat medium outlet and inlet paths 55 and 56, which are provided on the side of the upper casing 53, are allowed to communicate and connect with the joint portion 58, which is provided on the heat exchange pressing member 32, thereby making it possible to accommodate and install the heat exchange element 20 and the first and second control substrates 33-1 and 33-2 in the casing 51.

Accordingly, the PTC heaters 26 of the heat exchange element 20, the first and second control substrates 33-1 and 33-2, and the connection portions 48 and 49 of the harnesses, which require electrical connection, can be disposed adjacent to each other, thereby improving the workability upon electrical connection therebetween. In this structure, there is no need to secure the accommodation space for the screws 31 for fastening and fixing the heat exchange pressing member 32, for example, and the dimension in the height direction of the heat medium heating device 10 can be reduced by the amount corresponding to the dimension.

On the inner bottom surface of the lower casing 52, the boss portions 54 each having a predetermined height for fastening and fixing the heat exchange pressing member 32 are integrally formed at four corners. The heat exchange pressing member 32 is fastened and fixed to the boss portions 54, thereby making it possible to press the heat exchange element 20 against the inner bottom surface of the lower casing 52 to fasten and fix the heat exchange element 20. Accordingly, the flat heat exchange tubes 21 and the PTC heaters 26, which constitute the heat exchange element 20, are brought into close contact with each other, and the outlet/inlet header portions 22 and 23 of the plurality of flat heat exchange tubes 21 are also brought into close contact with each other. This makes it possible to reduce the contact thermal resistance to thereby improve the heat transfer efficiency, and to prevent leakage of the heat medium to thereby improve the reliability.

The joint portion 58 provided on the heat exchange pressing member 32 projects to the upper surface side, and is an annular protrusion to which the heat medium outlet and inlet paths 55 and 56, which are provided on the upper casing 53, are fit and connected through the seal material 57. Accordingly, when the upper casing 53 is overlaid on the lower casing 52 and the both casings are integrated, the heat medium outlet and inlet paths 55 and 56, which are provided on the side of the upper casing 53, are fit and connected to the annular protrusion (joint portion 58) projecting from the upper surface of the heat exchange pressing member 32, thereby forming the flow passage for circulating the heat medium which communicates with the outlet/inlet header portions 22 and 23 of the flat heat exchange tubes 21. Accordingly, also when the heat medium outlet and inlet paths 55 and 56 are provided on the side of the upper casing 53 which is separate from the lower casing 52 for fastening and fixing the heat exchange element 20, the flow passage for circulating the heat medium can be relatively easily formed without complication of the flow passage, with the heat exchange pressing member 32 as a relay member.

Furthermore, in this embodiment, the control substrate includes the two control substrates, i.e., the first control substrate 33-1 and the second control substrate 33-2, which are connected through the connector. The first control substrate 33-1 is fixed and installed on the upper surface of the heat exchange pressing member 32 and is connected with the terminals 29 extending from the electrode plates 28 constituting the PTC heaters 26. The control circuit including the exothermic electrical components (power transistors) 34 that control energization to the PTC heaters 26 is mounted on the control substrate. The second control substrate 33-2 is fixed and installed on the inner surface of the upper casing 53. The power supply HV harness 41 and the control LV harness 44 are connectable to the control substrate through the terminal and connector.

Thus, when the upper casing 53 is overlaid on the lower casing 52 and the both casings are coupled and integrated, the first control substrate 33-1, which is installed on the upper surface of the heat exchange pressing member 32 on the side of the lower casing 52, and the second control substrate 33-2, which is installed on the inner surface of the upper casing 53, are connected through the connector, thereby enabling electrical connection between the electrical device on the side of the lower casing 52 and the electrical device on the side of the upper casing 53. Thus, it is possible to facilitate the work for connecting the electrical system between the first and second control substrates 33-1 and 33-2 and the power supply HV harness 41 and the control LV harness 44, and between the first and second control substrates 33-1 and 33-2 and the PTC heaters 26.

Note that the present invention is not limited to the invention set forth in the embodiments described above, but can be modified as appropriate without departing from the scope of the invention. For example, the embodiments described above employ the structure in which the plurality of flat heat exchange tubes 21 is stacked in multiple layers and the plurality of pairs of PTC heaters 26 is incorporated therebetween. The number of the flat heat exchange tubes 21 and the PTC heaters 26 are increased or reduced depending on the capability of the heat medium heating device 10.

As an example of the flat heat exchange tubes 21, the tube which is provided with the inlet header portion 22 and the outlet header portion 23 on one end side of the tube and which forms the U-turn flow passage therebetween has been described above. However, a tube provided with the inlet header portion on one end side and the outlet header portion on the other end side may also be used. In this case, the heat medium outlet and inlet paths provided on the side of the casing are provided to be divided to right and left sides so as to correspond to the outlet/inlet header portions.

While the embodiments described above illustrate an example in which the casings 11 and 51 are made by aluminum die casting, the casings 11 and 51 may also be made of a resin material such as PPS. In this case, in the partition wall 12 of the first embodiment, the portion constituting at least a heat sink may be formed of a plate material made of an aluminum alloy, for example.

What is claimed is:

1. A heat medium heating device comprising:
    a plurality of flat heat exchange tubes through which a heat medium flowing from an inlet header portion flows through a flat tube portion and flows out from an outlet header portion;
    a plurality of pairs of PTC heaters incorporated between the flat tube portions of the plurality of flat heat exchange tubes, wherein
    a heat exchange element formed by alternately stacking the flat heat exchange tubes and the PTC heaters in multiple layers is fastened and fixed into a casing including heat medium outlet and inlet paths communicating with the outlet header portion and the inlet header portion, and
    a connection portion between a power supply HV harness and a control LV harness is formed on an outer surface on the same side as a surface on which the heat medium outlet and inlet paths of the casing are formed, and a control substrate that controls energization to the PTC heaters is disposed on an inside on the same side as the surface on which the connection portion of the casing is formed.

2. The heat medium heating device according to claim 1, wherein
    the casing is provided with a partition wall formed therein,
    the heat exchange element is pressed by a heat exchange pressing member and fastened and fixed to one surface of the partition wall, and an outside thereof is sealed with a bottom plate, and
    the control substrate is installed on the other side of the partition wall, and an outside thereof is sealed with an upper plate including the connection portion.

3. The heat medium heating device according to claim 2, wherein a control circuit including an exothermic electrical component that controls the PTC heaters is mounted on the control substrate, the exothermic electrical component being capable of cooling with the partition wall as a heat sink.

4. The heat medium heating device according to claim 2, wherein a control circuit including an exothermic electrical component that controls the PTC heaters is mounted on the surface of the control substrate, and a heat penetration portion made of a high heat-conductive material and penetrating through both surfaces corresponding to a mounting position of the exothermic electrical component is provided, the exothermic electrical component being capable of cooling with the partition wall as a heat sink through the heat penetration portion.

5. The heat medium heating device according to claim 4, wherein a heat conductive insulator comprising one of a heat conductive liquid gap material and a low-hardness insulating heat conductive sheet is interposed between the heat penetration portion of the control substrate and the partition wall.

6. The heat medium heating device according to claim 5, wherein the control substrate is disposed on an upper surface of the partition wall through an insulating sheet, and the insulating sheet is provided with an opening corresponding to a portion in which the heat conductive liquid gap material is interposed.

7. The heat medium heating device according to claim 6, wherein the opening has an area larger than the area of the heat penetration portion.

8. The heat medium heating device according to claim 6, wherein an upper surface of the partition wall is provided with a plurality of protrusions, and holes formed in the insulating sheet and/or the control substrate are fit into the protrusions to enable positioning of the insulating sheet and/or the control substrate.

9. The heat medium heating device according to claim 3, wherein at least a portion serving as a heat sink of the partition wall is made of an aluminum alloy.

10. The heat medium heating device according to claim 2, wherein boss portions each having a predetermined height for fastening and fixing the heat exchange pressing member are integrally formed at four corners on the one side of the partition wall.

11. The heat medium heating device according to claim 2, wherein the heat medium outlet and inlet paths extend from the other surface of the partition wall, are opened to the one side on which the heat exchange element is fixed and installed through the partition wall, and are communicable with the outlet/inlet header portion of each of the flat heat exchange tubes.

12. The heat medium heating device according to claim 2, wherein the partition wall is provided with a through-hole penetrating through a terminal extending from an electrode plate constituting each of the PTC heaters, and the terminal is connectable to a terminal board of the control substrate disposed on the other side with the partition wall interposed therebetween.

13. The heat medium heating device according to claim 12, wherein the terminal is allowed to be positioned through a grommet installed in the through-hole.

14. The heat medium heating device according to claim 1, wherein
the casing comprises: a lower casing to which the heat exchange element is pressed to be fastened and fixed to an inner bottom surface through a heat exchange pressing member; and an upper casing provided with the heat medium outlet and inlet paths and the connection portion,
the control substrate is disposed between an inner surface of the upper casing and an upper surface of the heat exchange pressing member, and
the heat exchange pressing member is provided with a through-hole communicating with the outlet/inlet header portion of each of the flat heat exchange tubes, and a joint portion is integrally provided with the through-hole, the joint portion connecting the heat medium outlet and inlet paths provided on the upper casing with the through-hole so as to communicate with each other.

15. The heat medium heating device according to claim 14, wherein boss portions each having a predetermined height for fastening and fixing the heat exchange pressing member are integrally formed at four corners on the inner bottom surface of the lower casing.

16. The heat medium heating device according to claim 14, wherein the joint portion provided on the heat exchange pressing member projects to an upper surface side thereof, and the heat medium outlet and inlet paths comprise an annular protrusion to which the heat medium outlet and inlet paths provided on the upper casing are fit and connected through a seal material.

17. The heat medium heating device according to claim 14, wherein
the control substrate comprises two control substrates, a first control substrate and a second control substrate, which are connected through a connector,
the first control substrate is a control substrate that is fixed and installed on an upper surface of the heat exchange pressing member and is connected with a terminal extending from an electrode plate constituting each of the PTC heaters, and a control circuit including a power transistor that controls energization to the PTC heaters is mounted thereon, and
the second control substrate is a control substrate that is fixed and installed on an inner surface of the upper casing, and the power supply HV harness and the control LV harness are connectable thereto through a terminal, a connector or the like.

18. A vehicle air conditioner that allows a heat medium heated by a heat medium heating device to circulate with respect to a radiator disposed in an air flow passage, wherein the heat medium heating device is a heat medium heating device according to claim 1.

* * * * *